(12) United States Patent
Baird et al.

(10) Patent No.: US 9,192,931 B2
(45) Date of Patent: Nov. 24, 2015

(54) PROCESSES FOR WASHING A SPENT ION EXCHANGE BED AND FOR TREATING BIOMASS-DERIVED PYROLYSIS OIL, AND APPARATUSES FOR TREATING BIOMASS-DERIVED PYROLYSIS OIL

(75) Inventors: Lance Awender Baird, Prospect Heights, IL (US); Timothy A. Brandvold, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 712 days.

(21) Appl. No.: 13/436,648

(22) Filed: Mar. 30, 2012

(65) Prior Publication Data
US 2013/0255136 A1   Oct. 3, 2013

(51) Int. Cl.
| | |
|---|---|
| C10L 1/00 | (2006.01) |
| B01D 24/46 | (2006.01) |
| B01J 49/00 | (2006.01) |
| B01J 39/04 | (2006.01) |
| C10G 3/00 | (2006.01) |
| B01J 39/20 | (2006.01) |

(52) U.S. Cl.
CPC ............. *B01J 39/043* (2013.01); *B01J 39/20* (2013.01); *B01J 49/0008* (2013.01); *B01J 49/0069* (2013.01); *B01J 49/0078* (2013.01); *C10G 3/50* (2013.01)

(58) Field of Classification Search
USPC .................................. 210/190; 44/307; 521/26
See application file for complete search history.

(56) References Cited

U.S. PATENT DOCUMENTS

| | | | |
|---|---|---|---|
| 4,458,033 A | 7/1984 | Yan et al. | |
| 7,511,181 B2 | 3/2009 | Petri et al. | |
| 2003/0044335 A1* | 3/2003 | Jangbarwala | 423/24 |
| 2010/0330633 A1 | 12/2010 | Walther et al. | |
| 2011/0146135 A1 | 6/2011 | Brandvold | |
| 2011/0146141 A1 | 6/2011 | Frey et al. | |
| 2011/0146145 A1* | 6/2011 | Brandvold et al. | 44/457 |
| 2011/0239532 A1* | 10/2011 | Baldiraghi et al. | 44/388 |
| 2012/0017495 A1* | 1/2012 | Traynor et al. | 44/401 |
| 2012/0322130 A1* | 12/2012 | Garcia-Perez et al. | 435/167 |
| 2013/0152455 A1* | 6/2013 | Baird et al. | 44/307 |

FOREIGN PATENT DOCUMENTS

CN          102380276          *  3/2012

OTHER PUBLICATIONS

Baird, L.A., et al., "Methods for Deoxygenating Biomass-Derived Pyrolysis Oil," for U.S. Appl. No. 13/326,050, filed Dec. 14, 2011.
Frey, S.J., et al, "Methods and Apparatuses for Forming Low-Metal Biomass-Derived Pyrolysis Oil," for U.S. Appl. No. 13/162,188, filed Jun. 16, 2011.

* cited by examiner

*Primary Examiner* — Prem C Singh
*Assistant Examiner* — Chantel Graham

(57) ABSTRACT

Processes and apparatuses for washing a spent ion exchange bed and for treating biomass-derived pyrolysis oil are provided herein. An exemplary process for washing a spent ion exchange bed employed in purification of biomass-derived pyrolysis oil includes the step of providing a ion-depleted pyrolysis oil stream having an original oxygen content. The ion-depleted pyrolysis oil stream is partially hydrotreated to reduce the oxygen content thereof, thereby producing a partially hydrotreated pyrolysis oil stream having a residual oxygen content that is less than the original oxygen content. At least a portion of the partially hydrotreated pyrolysis oil stream is passed through the spent ion exchange bed. Water is passed through the spent ion exchange bed after passing at least the portion of the partially hydrotreated pyrolysis oil stream therethrough.

10 Claims, 2 Drawing Sheets

PROCESSES FOR WASHING A SPENT ION EXCHANGE BED AND FOR TREATING BIOMASS-DERIVED PYROLYSIS OIL, AND APPARATUSES FOR TREATING BIOMASS-DERIVED PYROLYSIS OIL

STATEMENT REGARDING FEDERALLY SPONSORED RESEARCH OR DEVELOPMENT

This invention was made with Government support under DE-EE0002879 awarded by the U.S. Department of Energy. The Government has certain rights in this invention.

TECHNICAL FIELD

The present invention generally relates to processes and apparatuses for washing a spent ion exchange bed and for treating biomass-derived pyrolysis oil. In particular, the present invention relates to processes and apparatuses for washing a spent ion exchange bed that is employed in purification of biomass-derived pyrolysis oil.

BACKGROUND

Growth of world energy demand has prompted widespread research and development to identify alternative energy sources for satisfying such demand. One such promising alternative energy source is biofuel, which encompasses various types of combustible fuels that are derived from organic biomass. There is a strong desire to develop biofuels that are not only cost-competitive with fossil fuels but also offer environmental benefits and are renewable. One particular type of biofuel is biomass-derived pyrolysis oil. Biomass-derived pyrolysis oil can be burned directly as fuel for certain boiler and furnace applications. Biomass-derived pyrolysis oil can also serve as a potential feedstock in catalytic processes for the production of fuel in petroleum refineries. Biomass-derived pyrolysis oil has the potential to replace up to 60% of transportation fuels, thereby reducing the dependency on conventional fossil fuel and reducing its environmental impact.

Biomass-derived pyrolysis oil is produced through pyrolysis, including through recently-developed fast pyrolysis processes. Fast pyrolysis is a process during which organic biomass, such as wood waste, agricultural waste, etc., are rapidly heated to about 450° C. to about 600° C. in the absence of air using a pyrolysis reactor. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a condensing system to produce a biomass-derived pyrolysis oil stream. Biomass-derived pyrolysis oil is a complex, highly oxygenated organic liquid that typically contains about 20-30% by weight water with high acidity (TAN>150).

The biomass-derived pyrolysis oil stream often contains metal ions that may be detrimental to downstream processing and usage of the biomass-derived pyrolysis oil. For example, the metal ions may form deposits on equipment, may result in poor emission performance of the biomass-derived pyrolysis oil, and/or may cause catalyst poisoning in downstream fuel upgrading processes. To remove metal ions from the biomass-derived pyrolysis oil stream, ion exchange beds are commonly employed downstream of the pyrolysis reactor.

The ion exchange beds are frequently regenerated to clean the metal ions therefrom, which serves to maintain consistent performance of the ion exchange beds. Water is typically employed for regenerating the ion exchange beds. However, biomass-derived pyrolysis oil is immiscible with water and will prevent proper regeneration of the ion exchange bed with water if the biomass-derived pyrolysis oil is still present in the ion exchange bed in high amounts. As such, before the ion exchange bed can be regenerated using water, the ion exchange bed is generally drained of the biomass-derived pyrolysis oil and flushed with an appropriate flushing stream that is miscible with the biomass-derived pyrolysis oil to remove most biomass-derived pyrolysis oil that remains in the ion exchange bed after draining. Ethanol, which is generally miscible with both water and the biomass-derived pyrolysis oil, is typically used to flush the biomass-derived pyrolysis oil from the ion exchange bed before regeneration with water. The ethanol used for flushing generally mixes with the biomass-derived pyrolysis oil after flushing and is processed with the biomass-derived pyrolysis oil in the downstream fuel upgrading processes. However, one common upgrading process for the biomass-derived pyrolysis oil is hydrotreating, which serves to reduce the oxygen content of the biomass-derived pyrolysis oil, thereby increasing fuel value of the biomass-derived pyrolysis oil. Hydrotreating biomass-derived pyrolysis oil that also includes ethanol converts the ethanol to ethane, which downgrades the fuel value of the biomass-derived pyrolysis oil.

Accordingly, it is desirable to provide processes and apparatuses that enable alternative options for flushing biomass-derived pyrolysis oil from ion exchange beds that will not downgrade the fuel value of the biomass-derived pyrolysis oil. It is also desirable to provide processes and apparatuses that still enable effective regeneration of the ion exchange bed with water through use of an appropriate flushing stream that is sufficiently miscible with water. Furthermore, other desirable features and characteristics of the present invention will become apparent from the subsequent detailed description of the invention and the appended claims, taken in conjunction with the accompanying drawings and this background of the invention.

BRIEF SUMMARY

Processes and apparatuses for washing a spent ion exchange bed and for treating biomass-derived pyrolysis oil are provided herein. In an embodiment, a process for washing a spent ion exchange bed employed in purification of biomass-derived pyrolysis oil includes the step of providing an ion-depleted pyrolysis oil stream having an original oxygen content. The ion-depleted pyrolysis oil stream is partially hydrotreated to reduce the oxygen content thereof, thereby producing a partially hydrotreated pyrolysis oil stream having a residual oxygen content that is less than the original oxygen content. At least a portion of the partially hydrotreated pyrolysis oil stream is passed through the spent ion exchange bed. Water is passed through the spent ion exchange bed after passing at least the portion of the partially hydrotreated pyrolysis oil stream therethrough.

In another embodiment, a process for treating biomass-derived pyrolysis oil that includes a metal ion component and that has an original oxygen content includes the step of pyrolyzing a biomass feed in a pyrolysis reactor to form a biomass-derived pyrolysis vapor stream. At least a portion of the biomass-derived pyrolysis vapor stream is condensed in a condensing system to form a biomass-derived pyrolysis oil stream. The biomass-derived pyrolysis oil stream is passed through an ion exchange bed to form an ion-depleted pyrolysis oil stream. The ion-depleted pyrolysis oil stream is partially hydrotreated in a hydrotreating device to reduce the oxygen content thereof, thereby producing a partially hydrotreated pyrolysis oil stream having a residual oxygen content that is less than the original oxygen content. At least a portion of the partially hydrotreated pyrolysis oil stream is passed through the spent ion exchange bed. Water is passed through the spent ion exchange bed after passing at least the portion of the partially hydrotreated pyrolysis oil stream therethrough.

In another embodiment, an apparatus is provided for washing a spent ion exchange bed that is employed in purification of biomass-derived pyrolysis oil. The apparatus includes an ion exchange bed for receiving the biomass-derived pyrolysis oil and for forming an ion-depleted pyrolysis oil stream. The apparatus further includes a hydrotreating device for receiving the ion-depleted pyrolysis oil stream and for forming a partially hydrotreated pyrolysis oil stream. The hydrotreating device is in fluid communication with the ion exchange bed through the partially hydrotreated pyrolysis oil stream for passing at least a portion of the partially hydrotreated pyrolysis oil stream through the ion exchange bed.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
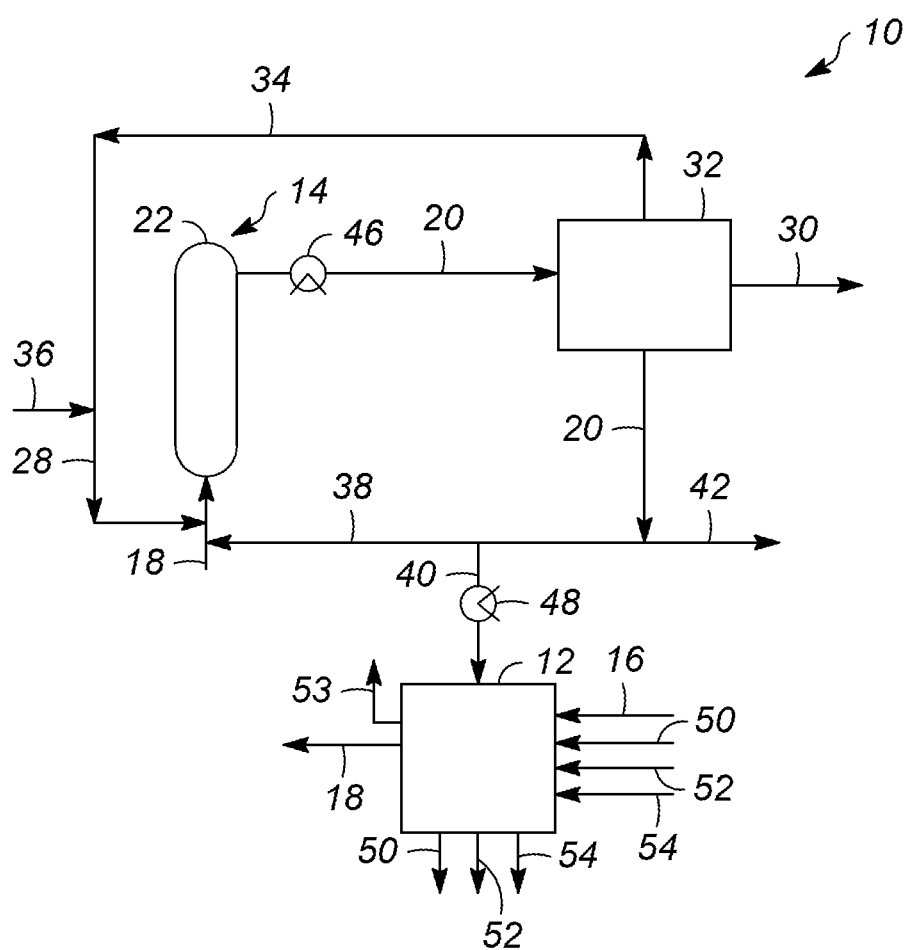
FIG. 1 is a schematic diagram of an apparatus and a process for washing a spent ion exchange bed that is employed in purification of biomass-derived pyrolysis oil in accordance with an exemplary embodiment.

The following detailed description is merely exemplary in nature and is not intended to limit the invention or the application and uses of the invention. Furthermore, there is no intention to be bound by any theory presented in the preceding background or the following detailed description.

Processes and apparatuses for washing a spent ion exchange bed employed in purification of biomass-derived pyrolysis oil, as well as processes and apparatuses for treating biomass-derived pyrolysis oil, are provided herein. As referred to herein, "purification" refers to removing at least some metal ions from the biomass-derived pyrolysis oil. The processes and apparatuses described herein enable regeneration of spent ion exchange beds that are used in the processes and apparatuses and provide an alternative manner in which the ion exchange beds are flushed of biomass-derived pyrolysis oil prior to washing with water during regeneration. As referred to herein, "regeneration" refers to removal of at least a portion of metal ions from the ion exchange bed, which metal ions were retained in the ion exchange bed as a result of passing biomass-derived pyrolysis oil that contains metal ions therethrough. As also referred to herein, "washing" refers generally to removing biomass-derived pyrolysis oil from the ion exchange bed, and may further include regeneration of the ion exchange bed (although the term "washing" is not to be interpreted as requiring regeneration of the ion exchange bed). In particular, a partially hydrotreated pyrolysis oil stream is passed through the spent ion exchange bed, and is used to flush the biomass-derived pyrolysis oil from the spent ion exchange bed. Because the partially hydrotreated pyrolysis oil is only partially hydrotreated, heteroatoms including oxygen remain in the partially hydrotreated pyrolysis oil, thereby enabling the partially hydrotreated pyrolysis oil stream to be sufficiently miscible with both the biomass-derived pyrolysis oil to be flushed from the spent ion exchange bed and with water. In particular, the partially hydrotreated pyrolysis oil may have a solubility in the biomass-derived pyrolysis oil of at least about 10 g per 100 g of the biomass-derived pyrolysis oil, such as from about 25 to about 100 g per 100 g of the biomass-derived pyrolysis oil. Additionally, the partially hydrotreated pyrolysis oil may have a solubility in water of at least about 5 g per 100 g of water, such as from about 10 to about 50 g per 100 g of water. As such, the partially hydrotreated pyrolysis oil stream is effective for flushing the biomass-derived pyrolysis oil from the ion exchange bed in anticipation of washing with water, which would otherwise be difficult due to immiscibility between biomass-derived pyrolysis oil and water. The partially hydrotreated pyrolysis oil stream may be readily available from downstream processing of the biomass-derived pyrolysis oil, thereby avoiding the need to supply an external flushing stream. Further, unlike flushing with alcohols such as ethanol, the instant processes and apparatuses will not downgrade the fuel value of the biomass-derived pyrolysis oil upon mixing of the partially hydrotreated pyrolysis oil stream (after flushing the ion exchange bed) with other biomass-derived pyrolysis oil that is passed through the ion exchange bed under the normal course of operation.

An exemplary embodiment of a process for washing a spent ion exchange bed 12 that is employed in purification of biomass-derived pyrolysis oil will now be addressed with reference to an exemplary apparatus 10 as shown in FIG. 1. Referring to FIG. 1, the apparatus 10 includes an ion exchange bed 12 and a hydrotreating device 14. In this embodiment, a biomass-derived pyrolysis oil stream 16 is passed through the ion exchange bed 12 to form an ion-depleted pyrolysis oil stream 18. The biomass-derived pyrolysis oil stream 16 is a complex, organic liquid having an original oxygen content, and may also contain water. For example, the original oxygen content of the biomass-derived pyrolysis oil stream 16 can be from about 30 to about 60 weight %, such as from about 40 to about 55 weight %, based on the total weight of the biomass-derived pyrolysis oil stream 16. Water can be present in the biomass-derived pyrolysis oil stream 16 in an amount of from about 10 to about 35 weight %, such as from about 20 to about 32 weight %, based on the total weight of the biomass-derived pyrolysis oil stream 16. The ion exchange bed 12 becomes spent after accumulating a threshold amount of metal ions therein as a result of passing the biomass-derived pyrolysis oil stream 16 that contains metal ions therethrough. The threshold amount of metal ions that accumulate in the ion exchange bed 12 to deem the ion exchange bed 12 as "spent" is an application-specific value and may depend upon a variety of factors including, but not limited to, the type of ion exchange resins used and/or the desired purity of the ion-depleted pyrolysis oil stream 18. For purposes of the instant application, the ion exchange bed 12 may be considered spent upon measurement by ICP-AAS of effluent metals concentration in the ion-depleted pyrolysis oil stream 18 that exceeds the requirement of the downstream processes, e.g. >10 parts per million (ppm) total metals, such as from about 50 to about 100 ppm total metals. An alternative measure by which the ion exchange bed 12 may be deemed "spent" is when it reaches from 30 to 40% of its theoretical ion exchange capacity as calculated from a quantity of ion exchange resin in the ion exchange bed 12 and an average concentration of ions in the biomass-derived pyrolysis oil stream 16 that is passed through the ion exchange bed 12. The biomass-derived pyrolysis oil stream 16 can be provided from any source. It is to be appreciated that in other embodiments, the ion exchange bed 12 is provided in spent form and the processes do not actually require the step of passing biomass-derived pyrolysis oil stream 16 through the ion exchange bed 12.

When the biomass-derived pyrolysis oil stream 16 is passed through the ion exchange bed 12 in accordance with the exemplary process, the biomass-derived pyrolysis oil stream 16 may be passed through the ion exchange bed 12 at a Liquid Hourly Space Velocity (LHSV) of from about 0.1 to about 20 $hr^{-1}$, such as from about 1 to about 10 $hr^{-1}$. When an amount of metal ions in the ion-depleted pyrolysis oil stream 18 reach a target concentration, or when ion concentration is constant (as determined by repeat measurements) over an extended time period, ion-exchange is deemed "complete" and the ion-depleted pyrolysis oil stream 18 is passed from the ion exchange bed 12. Ion concentrations in the ion-depleted pyrolysis oil stream 18 may be measured by Atomic Absorption Spectroscopy (AAS), Inductively-Coupled Plasma-Atomic Absorption Spectroscopy (ICP-AAS) or other known methods.

Ion exchange beds useful in the processes and apparatuses described herein include one or more conventional ion exchange resins. Exemplary ion exchange resins include acidic cation-exchange resins. The acidic cation-exchange resins may be used in a protonated form, i.e., with all of the active groups being —$SO_3H$. Neutralized sulfonic acid resins, in which some or all of the protons have been exchanged by a cation such as lithium, sodium, potassium, magnesium, and calcium, are also suitable. However, if the ion exchange resins are supplied with an alternate counterion (i.e sodium, Na+), then the acid form may be generated prior to use by treatment with aqueous acid (such as hydrochloric, nitric, or sulfuric acid, etc.). This is commonly known in the art as ion-exchange resin activation. Particular examples of suitable acidic cation-exchange resins include sulfonated copolymers of styrene.

Suitable sulfonic acid resins for use in the processes and apparatuses described herein include macroreticular resins. As used herein, "macroreticular resins" are made of two continuous phases—a continuous pore phase and a continuous gel polymeric phase. The continuous gel polymeric phase is structurally composed of small spherical microgel particles agglomerated together to form clusters, which, in turn, form interconnecting pores. The surface area arises from exposed surface of the microgel clusters. Macroreticular ion exchange resins can be made with different surface areas ranging from 7 to 1,500 $m^2/g$, and average pore diameters ranging from about 5 to about 10,000 nm.

Gel-type resins may also be used as the ion exchange resin. As used herein, "gel-type resins" are generally translucent. There are no permanent pore structures for the gel-type resins. The pores are generally considered to be molecular-scale micropores. The pore structures are determined by the distance between the polymer chains and crosslinks which vary with the crosslink level of the polymer, the polarity of the solvent, and the operating conditions.

Specific examples of suitable acidic ion-exchange resins include those manufactured by Dow Chemical Co. of Midland, Mich. under the tradenames/trademarks DOWEX® MARATHON C, DOWEX® MONOSPHERE C-350, DOWEX® HCR-S/S, DOWEX® MARATHON MSC, DOWEX® MONOSPHERE 650C, DOWEX® HCR-W2, DOWEX® MSC-1, DOWEX® HGR NG (H), DOWEX® DR-G8, DOWEX® 88, DOWEX® MONOSPHERE 88, DOWEX® MONOSPHERE C-600 B, DOWEX® MONOSPHERE M-31, DOWEX® MONOSPHERE DR-2030, DOWEX® M-31, DOWEX® G-26 (H), DOWEX® 50W-X4, DOWEX® 50W-X8, DOWEX® 66, those manufactured by Rohm and Haas of Philadelphia, Pa. under the tradenames/trademarks Amberlyst® 131, Amberlyst® 15, Amberlyst® 16, Amberlyst® 31, Amberlyst® 33, Amberlyst® 35, Amberlyst® 36, Amberlyst® 39, Amberlyst® 40 Amberlyst® 70, Amberlite® FPC11, Amberlite® FPC22, Amberlite® FPC23, those manufactured by Brotech Corp. of Bala Cynwyd, Pa. under the tradnames/trademarks Purofine® PFC150, Purolite® C145, Purolite® C150, Purolite® C160, Purofine® PFC100, Purolite® C100, and those manufactured by Thermax Limited Corp. of Novi, Mich. under the tradename/trademark Monoplus™ 5100 and Tulsion® T42.

The exemplary process continues with partially hydrotreating the ion-depleted pyrolysis oil stream 18 to reduce the oxygen content thereof, thereby producing a partially hydrotreated pyrolysis oil stream 20 having a residual oxygen content that is less than the original oxygen content. The ion-depleted pyrolysis oil stream 18 that is partially hydrotreated can be provided from any source. For example, the ion-depleted pyrolysis oil stream 18 can be provided from the ion exchange bed 12 of the apparatus 10. Alternatively, the ion-depleted pyrolysis oil stream 18 can be provided from a separate ion exchange bed (not shown) that is not part of the apparatus 10.

The ion-depleted pyrolysis oil stream 18 can be partially hydrotreated in any conventional manner so long as the residual oxygen content is achieved in the partially hydrotreated pyrolysis oil stream 20. In the exemplary embodiment of the process that is conducted in the apparatus 10 of FIG. 1, the ion-depleted pyrolysis oil stream 18 can be partially hydrotreated within the hydrotreating device 14, in a batch or semicontinuous or continuous process. Generally, the ion-depleted pyrolysis oil stream 18 is in a partially vaporized state and is introduced into the hydrotreating device 14, which includes a hydrotreating reactor 22 having a hydrotreating catalyst bed. In embodiments, the hydrotreating reactor 22 may be a continuous flow reactor, such as a fixed-bed reactor, a continuous stirred tank reactor (CSTR), a trickle bed reactor, an ebulliating bed reactor, a slurry reactor, or any other reactor known to those skilled in the art for hydroprocessing.

Hydrotreating removes gross amounts of heteroatoms such as sulfur, nitrogen, and oxygen, as well as other contaminants such as asphaltenes, from the ion-depleted pyrolysis oil stream 18, thereby upgrading the fuel value thereof. Partially hydrotreating the ion-depleted pyrolysis oil stream 18 includes contacting the ion-depleted pyrolysis oil stream 18 with a hydrotreating catalyst in the presence of a hydrogen-containing gas 28. Suitable hydrotreating catalysts are known in the art and include, but are not limited to, those that contain at least one metal component chosen from non-noble Group VIII (CAS Notation) or at least one metal component selected from the Group VIB (CAS notation) elements or mixtures thereof. Group VIB elements include chromium, molybdenum and tungsten. Group VIII elements include iron, cobalt and nickel. The amount(s) of metal component(s) in the catalyst can range from about 0.1% to about 25% by weight of Group VIII metal component(s) and from about 0.1% to about 25% by weight of Group VIB metal component(s), calculated as metal oxide(s) per 100 parts by weight of total catalyst, where the percentages by weight are based on the weight of the catalyst. In one particular example, the hydrotreating catalyst comprises one or more components of nickel and/or cobalt and one or more components of molybdenum and/or tungsten.

Partial hydrotreating of the ion-depleted pyrolysis oil stream 18 is conducted to only partially remove the heteroatoms and, in particular, the oxygen from the ion-depleted pyrolysis oil stream 18 for purposes of achieving the above-mentioned solubility of the partially hydrotreated pyrolysis oil stream 20 with the biomass-derived pyrolysis oil stream 16 and with water. As such, the partially hydrotreated pyrolysis oil stream 20 has the residual oxygen content that is less than the original oxygen content. For example, the ion-depleted pyrolysis oil stream 18 can be partially hydrotreated to have a residual oxygen content of from about 5 to about 30 weight %, such as from about 10 to about 20 weight %, based on the total weight of the partially hydrotreated pyrolysis oil stream 20 immediately after partial hydrotreating.

Hydrotreating devices and processes for hydrotreating ion-depleted pyrolysis oil streams are known to one skilled in the art, and conditions for partially hydrotreating the ion-depleted pyrolysis oil stream 18 can be controlled to achieve the above-referenced residual oxygen contents in the partially hydrotreated pyrolysis oil stream 20, while also ensuring that the partially hydrotreated pyrolysis oil stream 20 has a liquid phase. Particular hydrotreating conditions in the hydrotreating device 14 that may impact the residual oxygen content of the partially hydrotreated pyrolysis oil stream 20 can include a temperature of the ion-depleted pyrolysis oil stream 18 immediately prior to hydrotreating. In an embodiment, temperature of the ion-depleted pyrolysis oil stream 18 can be increased by recycling a portion of partially hydrotreated oil stream 20 in a recycle stream 38 and mixing the recycle stream 38 with the ion-depleted pyrolysis stream 18 prior to partial hydrotreating. Without being bound by any particular theory, it is believed that mixing the recycle stream 38 and ion-depleted pyrolysis stream 18 to increase the temperature of the ion-depleted pyrolysis stream 18 retards the rate of solids formation and solubilizes any solids that are formed prior to hydrotreating the mixed recycle stream 38 and ion-depleted pyrolysis stream 18. Furthermore, the additional volume minimizes residence time, which results in minimized solids formation in the partially hydrotreated pyrolysis oil stream 20. For example, in an embodiment, the combined ion-depleted pyrolysis stream 18 and recycle stream 38 has a temperature of about 150° C. or greater, for example from about 150 to about 400° C., such as from about 300 to about 375° C., prior to partial hydrotreating in the hydrotreating reactor 22. In an exemplary embodiment, the residence time is about 60 seconds or less, for example about 20 seconds or less, for example about 10 second or less, such as from about 10 to about 1 seconds. A liquid hourly space velocity of the combined ion-depleted pyrolysis stream 18 and recycle stream 38, on a basis of volume of the combined stream/volume of catalyst/hour ($hr^{-1}$), may be from about 0.5 to about 1 $hr^{-1}$. The hydrogen-containing gas 28 may be provided at a treat rate of from about 1,000 to about 15,000 standard cubic feet per barrel (SCF/B). The hydrogen-containing gas 28 may be mixed with the ion-depleted pyrolysis oil stream 18 prior to partially hydrotreating the ion-depleted pyrolysis oil stream 18 in the hydrotreating reactor 22, as shown in FIG. 1, or may be separately introduced from the ion-depleted pyrolysis oil stream 18 concurrent with partially hydrotreating the ion-depleted pyrolysis oil stream 18 in the hydrotreating reactor 22.

Generally, during hydrotreating in the hydrotreating reactor, 14, pressure in the hydrotreating reactor 14 can be in a range of from about 2 to about 20 MPa, and temperature within the hydrotreating reactor 14 can be from about 150 to about 1000° C., such as from about 150 to about 750° C., for example from about 150 to about 400° C. In any event, residual oxygen content of the partially hydrotreated pyrolysis oil stream 20 can be monitored to ensure that a value within the above-stated ranges is achieved, or residual oxygen content within the above-stated ranges can be generally achieved through controlling the above-mentioned hydrotreating conditions without monitoring residual oxygen content. In embodiments, the partially hydrotreated pyrolysis oil stream 20 is an intermediate hydrotreated pyrolysis oil stream between multiple hydrotreating devices in conventional multi-stage hydrotreating systems.

In an exemplary embodiment of the process that is conducted in the apparatus 10 of FIG. 1, a solids/aqueous component 30, which includes entrained hydrotreating catalyst as well as water from hydrotreating of the ion-depleted pyrolysis oil stream 18, is separated from the partially hydrotreated pyrolysis oil stream 20 by feeding the partially hydrotreated pyrolysis oil stream 20 to a separation unit 32. Additionally, unreacted hydrogen 34 may be separated from the partially hydrotreated pyrolysis oil stream 20 and recovered for recycle to the hydrotreating device 14, with make-up hydrogen 36 supplementing the unreacted hydrogen 34 that is recycled to the hydrotreating device 14. In an alternative embodiment, no unreacted hydrogen is supplied to the hydrotreating device 14 and make-up hydrogen 36 supplies all of the hydrogen necessary for hydrotreating the ion-depleted pyrolysis oil stream 18 in the hydrotreating device 14. The solids/aqueous component 30 may be treated to recover hydrotreating catalyst and to properly remediate water that is separated from the partially hydrotreated pyrolysis oil stream 20 through conventional techniques.

In the exemplary embodiments of the process and the apparatus 10 contemplated herein, after the separation unit 32, the partially hydrotreated pyrolysis oil stream 20 is split into at least the recycle stream 38 and a flushing stream 40. In an embodiment, the partially hydrotreated pyrolysis oil stream 20 is further split into a product stream 42. For example, the product stream 42 can be split from the partially hydrotreated pyrolysis oil stream 20 prior to splitting the partially hydrotreated pyrolysis oil stream 20 into the recycle stream 38 and the flushing stream 40. The recycle stream 38 may be combined with the ion-depleted pyrolysis oil stream 18 prior to partial hydrotreating in the hydrotreating reactor 22. The product stream 42 may be further processed to produce an upgraded pyrolysis oil stream. The flushing stream 40 may be passed to the spent ion exchange bed 12 as described in further detail below. Splitting of the partially hydrotreated pyrolysis oil stream 20 may be conducted depending upon the desired flow in the aforementioned recycle stream 38, product stream 42, and flushing stream 40. For example, at times during operation of the hydrotreating device 14 when flushing of the ion exchange bed 12 is unnecessary, the apparatus 10 of FIG. 1 may be configured to split the partially hydrotreated pyrolysis oil stream 20 into the recycle stream 38 and product stream 42, with the flushing stream 40 split on an as-needed basis.

In an optional embodiment, the partially hydrotreated pyrolysis oil stream 20 is cooled to condense the partially hydrotreated pyrolysis oil stream 20 and/or to transfer heat to other streams prior to separating the solids/aqueous component 30 from the partially hydrotreated pyrolysis oil stream 20. Conventional techniques can be employed for cooling, including passing the partially hydrotreated pyrolysis oil stream 20 through a cooling device 46 such as a heat exchanger, a contact cooler, or the like. Alternatively, and as also shown in FIG. 1, the partially hydrotreated pyrolysis oil stream 20 may be cooled after splitting into at least the recycle stream 38 and the flushing stream 40. In particular, the flushing stream 40 can be cooled in accordance with the instant process in a second cooling device 48, which may be provided in addition or as an alternative to the cooling device 46 that is upstream of separation of the solids/aqueous component 30 from the partially hydrotreated pyrolysis oil stream 20.

The exemplary process continues with washing the spent ion exchange bed 12. In an embodiment, the spent ion exchange bed 12 is drained of biomass-derived pyrolysis oil prior to regeneration, with the drained biomass-derived pyrolysis oil passed on in the ion-depleted pyrolysis oil stream 18. Draining of the biomass-derived pyrolysis oil from the spent ion exchange bed 12 can be conducted with assistance, such as through air or nitrogen purge, or can be conducted gravimetrically depending upon the configuration of the ion exchange bed 12. Once the biomass-derived pyrolysis oil is drained from the spent ion exchange bed 12, the exemplary process continues with passing at least a portion of the partially hydrotreated pyrolysis oil stream 20 through the spent ion exchange bed 12. In particular, for the process conducted in the apparatus 10 as shown in FIG. 1, the flushing stream 40 that is separated from the partially hydrotreated pyrolysis oil stream 20 is passed through the spent ion exchange bed 12. However, it is to be appreciated that in other embodiments, the partially hydrotreated pyrolysis oil stream 20 can be passed through the spent ion exchange bed 12 without separating the recycle stream 38 and, optionally, the product stream 42 therefrom. Because the partially hydrotreated pyrolysis oil stream 20 is sufficiently miscible with the biomass-derived pyrolysis oil due to the residual oxygen content of the partially hydrotreated pyrolysis oil stream 20, the partially hydrotreated pyrolysis oil stream 20 is effective to remove residual biomass-derived pyrolysis oil from the spent ion exchange bed 12 in anticipation of passing water 50 through the spent ion exchange bed 12.

In the exemplary process as contemplated herein, passing at least the portion of the partially hydrotreated pyrolysis oil stream 20 through the spent ion exchange bed 12 produces a flushed pyrolysis oil stream 53. In an embodiment, the flushed pyrolysis oil stream 53 is discharged from the spent ion exchange bed 12 and is mixed with the ion-depleted pyrolysis oil stream 18 that is passed from the ion exchange bed 12. Alternatively or additionally (although not shown), the flushed pyrolysis oil stream 53 may be recycled to the biomass-derived pyrolysis oil stream 16 prior to passing into the ion exchange bed 12 for purposes of removing metal ions therefrom under circumstances in which the flushed pyrolysis oil stream 53 has an excessively high metal ion content.

The exemplary process continues with passing water 50 through the spent ion exchange bed 12 after passing at least the portion of the partially hydrotreated pyrolysis oil stream 20 therethrough. In particular, the process may include draining the partially hydrotreated pyrolysis oil stream 20 from the spent ion exchange bed 12, followed by passing the water 50 through the spent ion exchange bed 12. One or more cycles of water 50 can be passed through the spent ion exchange bed 12, with the same water 50 passed through the ion exchange bed 12 multiple times. Again, because the partially hydrotreated pyrolysis oil stream 20 has the above-described solubility with water, the partially hydrotreated pyrolysis oil stream 20 can be effectively washed from the spent ion exchange bed 12 with the water 50.

After washing the spent ion exchange bed 12 with water 50, the spent ion exchange bed 12 can be regenerated through conventional steps. In particular, the water 50 can be drained, optionally with assistance such as with air purge. One or more cycles of sodium chloride solution 52 (e.g., 10 mol % in water) can be passed through the spent ion exchange bed 12, followed by draining of the sodium chloride solution 52. An acidic ion-exchange regenerant 54 can then be passed through the spent ion exchange bed 12 to regenerate the spent ion exchange bed 12. In particular, one or more cycles of the acidic ion-exchange regenerant 54, such as sulfuric acid (e.g., 10 mol % in water), can be passed through the spent ion exchange bed 12 to regenerate the spent ion exchange bed 12 and thereby form a regenerated ion exchange bed 12. The acidic ion-exchange regenerant 54 is then drained and the regenerated ion exchange bed 12 can be washed with one or more cycles of water 50. After draining the water 50, the regenerated ion exchange bed 12 can be filled with ion-depleted pyrolysis oil stream 18 and returned to conventional operation.

Figure 2:
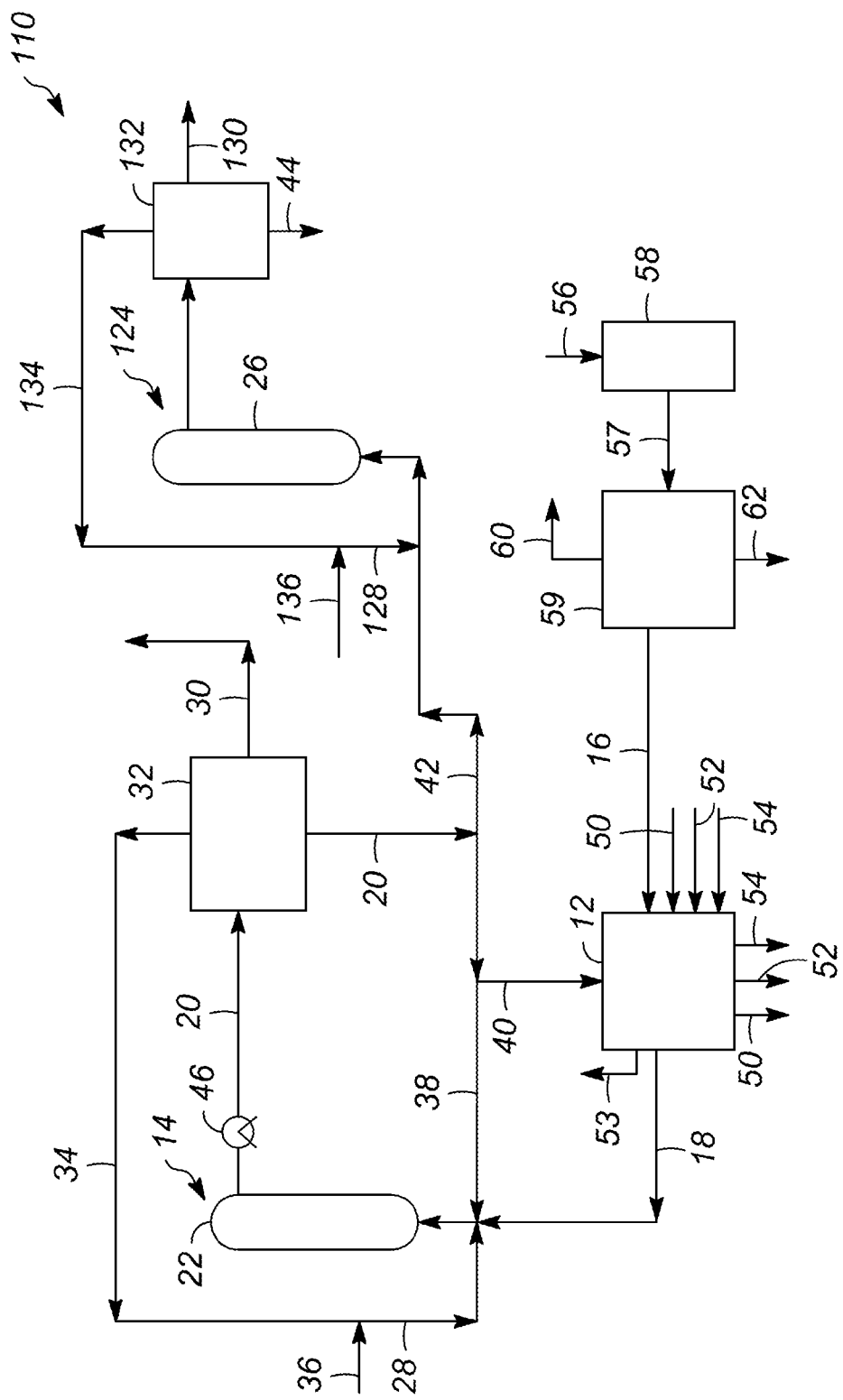
FIG. 2 is a schematic diagram of an apparatus and a process for treating biomass-derived pyrolysis oil in accordance with an exemplary embodiment.

An exemplary embodiment of a process for treating biomass-derived pyrolysis oil will now be addressed with reference to an exemplary apparatus 110 as shown in FIG. 2. In accordance with the exemplary process of this embodiment, a biomass feed 56 is pyrolyzed in a pyrolysis reactor 58 to form a biomass-derived pyrolysis vapor stream 57. As known in the art, pyrolysis is a thermochemical decomposition of organic material at elevated temperatures without the participation of oxygen. In this regard, pyrolysis is typically performed substantially in the absence of molecular oxygen, e.g., in the absence of air, as known in the art, although the presence of oxygen cannot be completely eliminated and some oxygen is typically present. The biomass-derived pyrolysis vapor stream 57 may be obtained by different pyrolysis processes, such as, but not limited to, fast pyrolysis, vacuum pyrolysis, catalytic pyrolysis, and slow pyrolysis (also known as carbonization). Fast pyrolysis, in particular, is a process during which organic biomass, such as wood waste, agricultural waste, etc., is rapidly heated to about 450° C. to about 600° C. in the absence of air. Under these conditions, the biomass-derived pyrolysis vapor stream 57 is produced in the pyrolysis reactor 58, along with char (which includes ash and combustible hydrocarbon solids). The biomass-derived pyrolysis vapor stream 57 includes organic vapors, water vapor, and pyrolysis gases. At least a portion of the biomass-derived pyrolysis vapor stream 57 is condensed in a condensing system 59 to form a biomass-derived pyrolysis oil stream 16 having an original oxygen content, with uncondensed gases 60 and char 62 expelled from the condensing system 59 and remediated through conventional treatments.

The exemplary embodiment of the process contemplated herein continues with passing the biomass-derived pyrolysis oil stream 16 through an ion exchange bed 12 to form an ion-depleted pyrolysis oil stream 18, which step is described in detail above in the context of the exemplary process conducted in the apparatus 10 of FIG. 1. In this embodiment, the ion-depleted pyrolysis oil stream 18 is partially hydrotreated in a hydrotreating device 14 to reduce the oxygen content thereof, thereby producing a partially hydrotreated pyrolysis oil stream 20 having a residual oxygen content that is less than the original oxygen content. In particular, the hydrotreating device 14 is in fluid communication with the ion exchange bed 12 through the ion-depleted pyrolysis oil stream 18. The ion-depleted pyrolysis oil stream 18 is partially hydrotreated as described in detail above in the context of the exemplary process conducted in the apparatus 10 of FIG. 1.

In accordance with the embodiment of the process that is conducted in the apparatus 110 of FIG. 2, the ion exchange bed 12 is spent after accumulating a threshold amount of metal ions therein during the normal course of operation of the apparatus 110. At least a portion of the partially hydrotreated pyrolysis oil stream 20 is passed through the spent ion exchange bed 12 as described in detail above in the context of the exemplary process conducted in the apparatus 10 of FIG. 1, after optionally draining the biomass-derived pyrolysis oil stream 16 from the spent ion exchange bed 12. In this embodiment, the hydrotreating device 14 is in fluid communication with the ion exchange bed 12 through the partially hydrotreated pyrolysis oil stream 20 for passing at least a portion of the partially hydrotreated pyrolysis oil stream 20 through the ion exchange bed 12. In particular, like the embodiment of the process conducted in the apparatus 10 of FIG. 1 as described above, a solids/aqueous component 30 and unreacted hydrogen 34 is separated from the partially hydrotreated pyrolysis oil stream 20 in a separation unit 32.

The partially hydrotreated pyrolysis oil stream 20 is split into at least a recycle stream 38 and a flushing stream 40, the flushing stream 40 is passed through the spent ion exchange bed 12, and the recycle stream 38 is combined with the ion-depleted pyrolysis oil stream 18 prior to partially hydrotreating the ion-depleted pyrolysis oil stream 18 in the hydrotreating reactor 22. Additionally, the partially hydrotreated pyrolysis oil stream 20 can be further split into a product stream 42, with the product stream 42 split from the partially hydrotreated pyrolysis oil stream 20 prior to splitting the partially hydrotreated pyrolysis oil stream 20 into the recycle stream 38 and the flushing stream 40. In this embodiment, the product stream 42 is additionally hydrotreated in at least one additional hydrotreating device 124 that includes a secondary hydrotreating reactor 26 to further reduce the oxygen content thereof. The upgraded pyrolysis oil stream 44 may be substantially free of an oxygen content. In particular, the upgraded pyrolysis oil stream 44 may have an oxygen content of less than or equal to about 2 weight %, such as from about 0.01 to about 0.5 weight %, based on the total weight of the upgraded pyrolysis oil stream 44 immediately after additional hydrotreating. The upgraded pyrolysis oil stream 44 can be further separated in an additional separating unit 132 to separate secondary unreacted hydrogen 134 and a secondary solids/aqueous component 130, which may include entrained hydrotreating catalyst as well as water, from the upgraded pyrolysis oil stream 44. The secondary unreacted hydrogen 134 may be recycled and supplemented with additional make-up hydrogen 136 before mixing the resulting hydrogen-containing gas 128 with the product stream 42 that is additionally hydrotreated in the at least one additional hydrotreating device 124.

After passing at least the portion of the partially hydrotreated pyrolysis oil stream 20 through the spent ion exchange bed 12 and optionally draining the partially hydrotreated pyrolysis oil stream 20 from the spent ion exchange bed 12, water 50 is passed through the spent ion exchange bed 12. The spent ion exchange bed 12 can then be regenerated in the same manner as described above in the context of the process conducted in the apparatus 10 of FIG. 1.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for treating biomass-derived pyrolysis oil comprising a metal ion component and having an original oxygen content, said process comprising the steps of:
    pyrolyzing a biomass feed in a pyrolysis reactor to form a biomass-derived pyrolysis vapor stream;
    condensing at least a portion of the biomass-derived pyrolysis vapor stream in a condensing system to form a biomass-derived pyrolysis oil stream;
    passing the biomass-derived pyrolysis oil stream through an ion exchange bed to form an ion-depleted pyrolysis oil stream;
    partially hydrotreating the ion-depleted pyrolysis oil stream in a hydrotreating device to reduce the oxygen content thereof, thereby producing a partially hydrotreated pyrolysis oil stream having a residual oxygen content that is less than the original oxygen content;
    passing at least a portion of the partially hydrotreated pyrolysis oil stream through the spent ion exchange bed; and
    passing water through the spent ion exchange bed after passing at least the portion of the partially hydrotreated pyrolysis oil stream therethrough.

2. The process of claim 1, further comprising the step of splitting the partially hydrotreated pyrolysis oil stream into at least a recycle stream and a flushing stream, and wherein the step of passing at least the portion of the partially hydrotreated pyrolysis oil stream through the spent ion exchange bed is further defined as passing the flushing stream through the spent ion exchange bed.

3. The process of claim 2, wherein the recycle stream is combined with the ion-depleted pyrolysis oil stream prior to partially hydrotreating the ion-depleted pyrolysis oil stream.

4. The process of claim 2, wherein the partially hydrotreated pyrolysis oil stream is further split into a product stream.

5. The process of claim 4, wherein the product stream is additionally hydrotreated in at least one additional hydrotreating device to further reduce the oxygen content thereof.

6. The process of claim 4, wherein the product stream is split from the partially hydrotreated pyrolysis oil stream prior to splitting the partially hydrotreated pyrolysis oil stream into the recycle stream and the flushing stream.

7. The process of claim 1, wherein the step of passing at least the portion of the partially hydrotreated pyrolysis oil stream through the ion exchange bed produces a flushed pyrolysis oil stream, and wherein the flushed pyrolysis oil stream is mixed with the ion-depleted pyrolysis oil stream prior to the step of partially hydrotreating the ion-depleted pyrolysis oil stream.

8. The process of claim 1, wherein the ion exchange bed is in fluid communication with the hydrotreating device and wherein the ion-depleted pyrolysis oil stream is passed from the ion exchange bed to the hydrotreating device.

9. The process of claim 1, further comprising the step of separating a solids/aqueous component from the partially hydrotreated pyrolysis oil stream.

10. The process of claim 9, further comprising the step of cooling the partially hydrotreated pyrolysis oil stream prior to the step of separating the solids/aqueous component from the partially hydrotreated pyrolysis oil stream.

* * * * *